United States Patent
Beney

(10) Patent No.: US 12,099,339 B2
(45) Date of Patent: Sep. 24, 2024

(54) CONTROL METHOD, MOTORISED DRIVE DEVICE, HOME AUTOMATION INSTALLATION COMPRISING SUCH A MOTORISED DRIVE DEVICE

(71) Applicant: SOMFY ACTIVITES SA, Cluses (FR)

(72) Inventor: Alain Beney, St Laurent (FR)

(73) Assignee: SOMFY ACTIVITES SA, Cluses (FR)

( * ) Notice: Subject to any disclaimer, the term of this patent is extended or adjusted under 35 U.S.C. 154(b) by 470 days.

(21) Appl. No.: 17/430,816

(22) PCT Filed: Feb. 14, 2020

(86) PCT No.: PCT/EP2020/053867
§ 371 (c)(1),
(2) Date: Aug. 13, 2021

(87) PCT Pub. No.: WO2020/165399
PCT Pub. Date: Aug. 20, 2020

(65) Prior Publication Data
US 2022/0163938 A1    May 26, 2022

(30) Foreign Application Priority Data
Feb. 15, 2019  (FR) ...................................... 1901554

(51) Int. Cl.
*G05B 19/04* (2006.01)
*G05B 19/042* (2006.01)

(52) U.S. Cl.
CPC .. *G05B 19/0428* (2013.01); *G05B 2219/2628* (2013.01); *G05B 2219/2653* (2013.01)

(58) Field of Classification Search
CPC ........ G05B 19/0428; G05B 2219/2628; G05B 2219/2653; G05B 2219/25381
See application file for complete search history.

(56) References Cited

U.S. PATENT DOCUMENTS

| | | | |
|---|---|---|---|
| 2015/0226001 A1* | 8/2015 | Adams | E06B 9/72 160/84.02 |
| 2017/0177057 A1* | 6/2017 | Morning-Smith | G06F 1/3287 |
| 2020/0033817 A1* | 1/2020 | Rebbert | G05B 11/01 |

FOREIGN PATENT DOCUMENTS

| | | |
|---|---|---|
| EP | 2028574 | 2/2009 |
| FR | 2478843 A1 | 9/1981 |

(Continued)

OTHER PUBLICATIONS

Cavarec Pierre-Emmanuel, "Method for operating an electromechanical actuator for a motorised screen drive and actuator thereof" (espacenet machine translation for EP2028574), Aug. 23, 2007, espacenet machine translation (Year: 2007).*

(Continued)

*Primary Examiner* — Christopher W Carter
(74) *Attorney, Agent, or Firm* — NIXON & VANDERHYE

(57) ABSTRACT

A method for controlling a motorised drive device including an actuator coupled to a mechanical load includes steps of: a) detecting a loss of electrical power; b) subsequent to detecting a loss of power, transferring at least a portion of the energy stored in a first capacitor connected to the input of a voltage regulator of the drive device to a second capacitor connected to the output of the voltage regulator; c) determining, during a first time period following the loss of power, whether the load has moved; d) when power is restored, controlling the movement of the load into a predefined reference position if mechanical load movement has been determined, or otherwise maintaining the load in its current position.

20 Claims, 3 Drawing Sheets

(56) References Cited

FOREIGN PATENT DOCUMENTS

| | | |
|---|---|---|
| FR | 2915817 | 11/2008 |
| IT | MI20021549 | 1/2004 |
| JP | 2000054766 A | 2/2000 |

OTHER PUBLICATIONS

Odate Kazuki, "Control Device for Opening and Closing Body" (espacenet machine translation for JP2000054766), Aug. 5, 1998, espacenet machine translation (Year: 1998).*
International Search Report for PCT/EP2020/053867 mailed Apr. 30, 2020, 6 pages.
Written Opinion of the ISA for PCT/EP2020/053867 mailed Apr. 30, 2020, 8 pages.
Search Report for FR1901554 dated Nov. 28, 2019, 2 pages.

* cited by examiner

CONTROL METHOD, MOTORISED DRIVE DEVICE, HOME AUTOMATION INSTALLATION COMPRISING SUCH A MOTORISED DRIVE DEVICE

This application is the U.S. national phase of International Application No. PCT/EP2020/053867 filed Feb. 14, 2020 which designated the U.S. and claims priority to FR Patent Application No. 1901554 filed Feb. 15, 2019, the entire contents of each of which are hereby incorporated by reference.

BACKGROUND OF THE INVENTION

Field of the Invention

The present invention relates in particular to a control method, to a motorised drive device for implementing this control method and to a home automation installation comprising such a motorised drive device.

Description of the Related Art

In the field of home automation, for residential, commercial or industrial buildings for example, there are home automation installations that include a screen that can be moved between an open position and a closed position, this movement being ensured by a motorised drive device that can be controlled by a user and which includes an electromechanical actuator, comprising an electric motor in particular, which is generally housed in a winding tube on which the screen is wound, or in a support rail for the screen.

In the case of home automation installations for occultation and/or closing, the screen is used to close and/or protect an opening of a building, such as an entrance, gate, window or garage entrance, in order to restrict access. The screen then includes a door, gate, blind, curtain or shutter, in particular a roller shutter or a swinging shutter. According to other examples, the screen can also be used to protect a building against solar radiation or against bad weather.

Typically, the drive device is intended to be electrically powered by a domestic electrical distribution grid. It may occur that the electrical power from the distribution grid is temporarily interrupted, forcing the shutdown of the home automation system.

When the electrical power is restored, the current screen position must be known by the drive device, in order to avoid the screen position not corresponding to a target position during subsequent movements commanded by a user, or the screen being moved beyond its position limit, for opening or closing for example, which could damage the home automation installation.

Drive devices are known to store the current screen position before turning off when the power is interrupted. However, in some cases, the screen may be moved during the power outage, so that once power is restored, the stored position no longer corresponds to the current screen position.

For example, a user may manually move the screen during the power outage by means of an auxiliary actuator, such as a hand crank. In the case of a terrace protection device, the position of the blind can be modified during a power outage by the action of the wind on the blind, for example, or of another element external to the device.

In practice, the actuation device can be programmed to recalibrate the screen position automatically as soon as power is restored, by moving the screen to a predefined reference position for example, or according to a sequence of predetermined movements, so as to bring the screen back to a known position and thus eliminate any discrepancy between the known position and the real screen position.

However, shifting movements repeated too frequently lead to premature wear of some mechanical parts of the home automation installation and/or of the actuation device. For example, the articulated arms of a terrace awning can only support a limited number of recalibrations. As a result, the awning cannot be reset after each power outage, which may reduce its life span.

Moreover, the electromechanical actuators of home automation systems must meet standards requiring a standby power consumption of less than 0.5 W. In standby mode, the actuator, in particular an electronic circuit of the actuator, awaits a possible movement command, without such movement being commanded. To meet this standard, it is known to limit the actuator supply voltage to a standby voltage sufficient to ensure power to the electronic circuit, but lower than the electric motor supply voltage. However, when the actuator comprises a capacitor to supply the electronic circuit for periods of mains power outage, this voltage limit also limits the capacitor charge voltage. This voltage limit would therefore impose a proportional increase in capacitor capacity, as well as an increase in its size, which is incompatible with the space constraints to be respected for a home automation installation actuator in a winding tube or a rail.

SUMMARY OF THE INVENTION

Embodiments of the invention intend to remedy these disadvantages more particularly by proposing a method for controlling a motorised drive device for a home automation installation.

To this end, according to one aspect of the invention, a method for controlling a motorised drive device including an actuator coupled to a movable mechanical load, the method comprising steps of:
 a) detecting a loss of electrical power to the drive device by an electronic control circuit of the motorised drive device;
 b) subsequent to detecting a loss of power, transferring at least a portion of the energy stored in at least a first filter capacitor, connected to the input of a voltage regulator of the drive device, to a second capacitor, connected to the output of the voltage regulator, the input of the voltage regulator being connected to electrical power connectors of the drive device;
 c) during a first time period following the loss of electrical power, the electronic control circuit determining whether the mechanical load has moved, the electronic control circuit being supplied with power by the second capacitor during this determining step;
 d) when the electrical power to the drive device is restored, controlling the mechanical load movement, by the electronic control circuit and by means of the actuator, into a predefined reference position if a mechanical load movement has been detected in step c) or, otherwise, maintaining the mechanical load in its current position if no movement has been detected in step c).

With the invention, by detecting whether the screen position has been changed during the power outage and in particular the predefined time period, the drive device determines whether or not it is necessary to recalibrate the screen position when electrical power is restored. This thus makes it possible to not to have to systematically carry out a recalibration of the screen position after each power supply interruption, thus avoiding premature wear of the home automation installation. Such a method can, moreover, be implemented in existing drive devices.

According to advantageous but non-mandatory aspects, such a control method may incorporate one or more of the following features, taken alone or in any technically permissible combination:
- the method further includes the electronic control circuit measuring the time period of the power supply interruption, and, in step d), the mechanical load being moved into a predefined reference position if the interruption time period is greater than or equal to a predefined maximum value, even if no movement has been detected in step c).
- the first time period is equal to the predefined maximum value.
- the energy transfer includes the electronic control circuit changing the electrical voltage applied to a control input of the voltage regulator from a first value to a second value.
- the first time period has a predefined value.
- the first time period is automatically modulated by the electronic control circuit according to the amount of energy remaining in the second capacitor.
- the amount of energy remaining in the second capacitor is periodically evaluated by the electronic control circuit.
- the method further includes turning off the electronic control circuit when the amount of energy remaining in the second capacitor falls below a predefined threshold According to another aspect, a motorised actuator device includes an actuator adapted to be coupled to a movable mechanical load, an electronic control circuit adapted to drive the actuator, a voltage regulator whose input is connected to the electrical power connectors, at least one first filter capacitor connected to the input of the voltage regulator, a second capacitor connected to the output of the voltage regulator, the electronic control circuit being programmed to:
 a) detect a loss of electrical power to the drive;
 b) after detecting a loss of electrical power, transfer at least part of the energy stored in the at least one first capacitor to the second capacitor
 c) during a first time period following the loss of electrical power, determine whether the mechanical load has moved, the electronic control circuit being supplied with electrical power by the second capacitor during this determination step
 d) when the electrical power to the drive is restored, controlling the mechanical load movement, by means of the actuator, into a predefined reference position if a mechanical load movement has been determined in step c), or otherwise, maintaining the mechanical load in its current position if no movement has been determined in step c).

According to another aspect, a home automation system includes a mechanical load such as a screen, movable between an open position and a closed position, and a motorised drive device as defined above, the actuator of the motorised drive device being coupled to the screen to move the mechanical load between the open position and the closed position.

BRIEF DESCRIPTION OF THE DRAWINGS

The invention will be better understood and other advantages thereof will become clearer in light of the following description of an embodiment of a control method, given only by way of example and made with reference to the appended drawings, in which.

DESCRIPTION OF THE PREFERRED EMBODIMENTS

Figure 1:
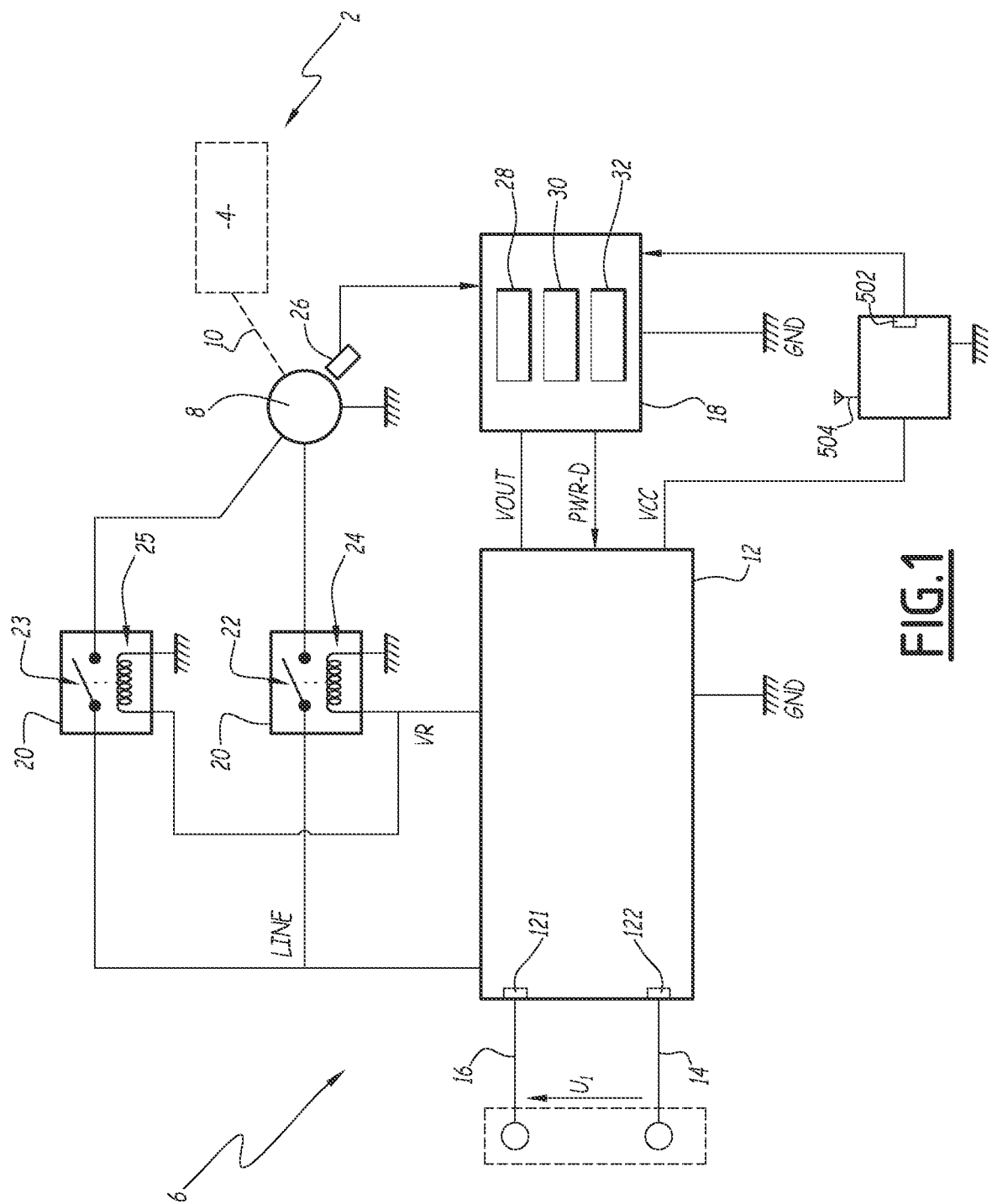
FIG. 1 is a synoptic diagram of a motorised actuation device for a home automation installation according to one of the embodiments of the invention.

FIG. 1 shows a home automation device 2, also referred to as a home automation installation, which may be a device to occult, close or protect against the sun. The home automation device comprises a motorised drive device 6 arranged to set a mobile element or screen 4 in motion. The motorised drive device 6 comprises an electromechanical actuator of a mobile element to occult, close or protect against the sun, such as a roller shutter, a swinging shutter, a door, a grille, a blind or any other equivalent material, hereinafter referred to as screen. However, the home automation device 2 can also be a garage door or a motorised gate. The electromechanical actuator comprises an electric motor 8, an output shaft and a reduction device (not shown) in a known manner. In particular, the electromechanical actuator is a tubular actuator, intended to be inserted into a winding tube on which the screen 4 is wound.

The electromechanical actuator may also comprise a device (not shown) for detecting the end of travel and/or an obstacle, which may be mechanical or electronic.

The screen 4 is reversibly movable between at least a first end position and at least a second end position. The first end position may correspond to an open position, for example, or a position in which the screen is completely rolled up. Similarly, the second end position may correspond to a closed position, for example, or a position in which the screen is fully unrolled. In practice, the screen 4 may also be moved and held in intermediate positions between the first end position and the second end position.

According to examples, the screen 4 is intended to protect an opening of a building or property, such as an entrance to a building or property, or a window or driveway, in order to restrict access thereto. The screen 4 may then be a door, or a gate, or a motorised window, sliding or tilt-turn for example, or a blind, curtain or a shutter, in particular a roller shutter or a swinging shutter.

According to other examples, the screen 4 can also be used to protect all or part of a building against solar radiation or against bad weather. The screen is intended to protect an opening, a balcony or a terrace, for example. The home automation device 2 to occult, close or protect against the sun may thus be associated with a building by being mounted on an interior or exterior part of the building, for example.

The motorised drive device 6 includes an actuator, mechanically coupled to the screen 4 and arranged to move the screen 4 between its different positions.

To this end, in some embodiments, the drive device 6 includes a coupling member 10, mechanically connected between the output shaft (not shown) of the electric motor 8 and the screen 4, so as to transmit a motion generated by the electric motor 8 to the screen 4.

In other words, a movement of the motor 8 results in a corresponding movement of the screen 4 in either direction, toward the first position or the second position.

The motor 8 thus provides a rotational motion that is transmitted and/or converted by the coupling member 10 or other dedicated member into a motion suitable for moving the screen 4, this motion selected depending on the nature and manner in which the screen 4 is arranged and/or installed.

According to examples, the motor 8 is an electric motor, an output shaft of which linked to a rotor of the motor is mechanically connected to the screen 4, here via the coupling member 10.

According to one embodiment, the electric motor is a DC motor. According to a variant embodiment, the electric motor is an AC motor.

In one variant, the actuator may include an electric cylinder, or any other electrically powered mechanical actuator.

According to non-exhaustive examples, the member 10 may include a gearbox, lever, rotating shaft, rack, gimbal or any appropriate transmission device, depending on the nature of the screen 4 and the motor 8.

The home automation device 2 also includes an electrical power circuit 12, arranged to provide different voltage values on different outputs of the electrical power circuit and electrical power terminals 14 and 16, connected to an input of the electrical power circuit 12.

The home automation device 2 and the electrical power circuit 12 in particular is intended to be connected electrically to a power source 13 external to the device, such as a domestic power distribution grid, in order to be powered by the external power source. For example, each of the terminals 121, 122 of the electrical power circuit 12 is intended to be connected electrically to the external power source 13 via electrical conductors 14, 16 including a neutral conductor and a phase conductor. An electrical supply voltage U1, in particular an AC voltage, can be applied between the terminals 121, 122 of the electrical supply circuit 12.

The home automation device 2 also includes an electronic command and/or control circuit 18 and an electrically controllable switching device 20.

According to one embodiment, the electrical power circuit 12 and/or the electronic command and/or control circuit 18 is included in an actuator housing. According to a variant embodiment, the electrical power circuit 12 and/or the electronic command and/or control circuit 18 is remote from the actuator, in the motorised drive device, for example.

For example, the switching device 20 comprises an electromechanical relay, having one or more movable contacts 22, 23 and one or more associated coils 24, 25 arranged to switch the or one of the movable contacts 22, 23 to a first position or a second position depending on whether the associated coil is energized or not. In one variant, the switching device 20 is a power transistor or a triac controllable by means of a control electrode, when the motor is of the AC induction type, for example. In another embodiment, the switching device may comprise an inverter if the motor is of the brushless type with permanent magnets.

Figure 2:
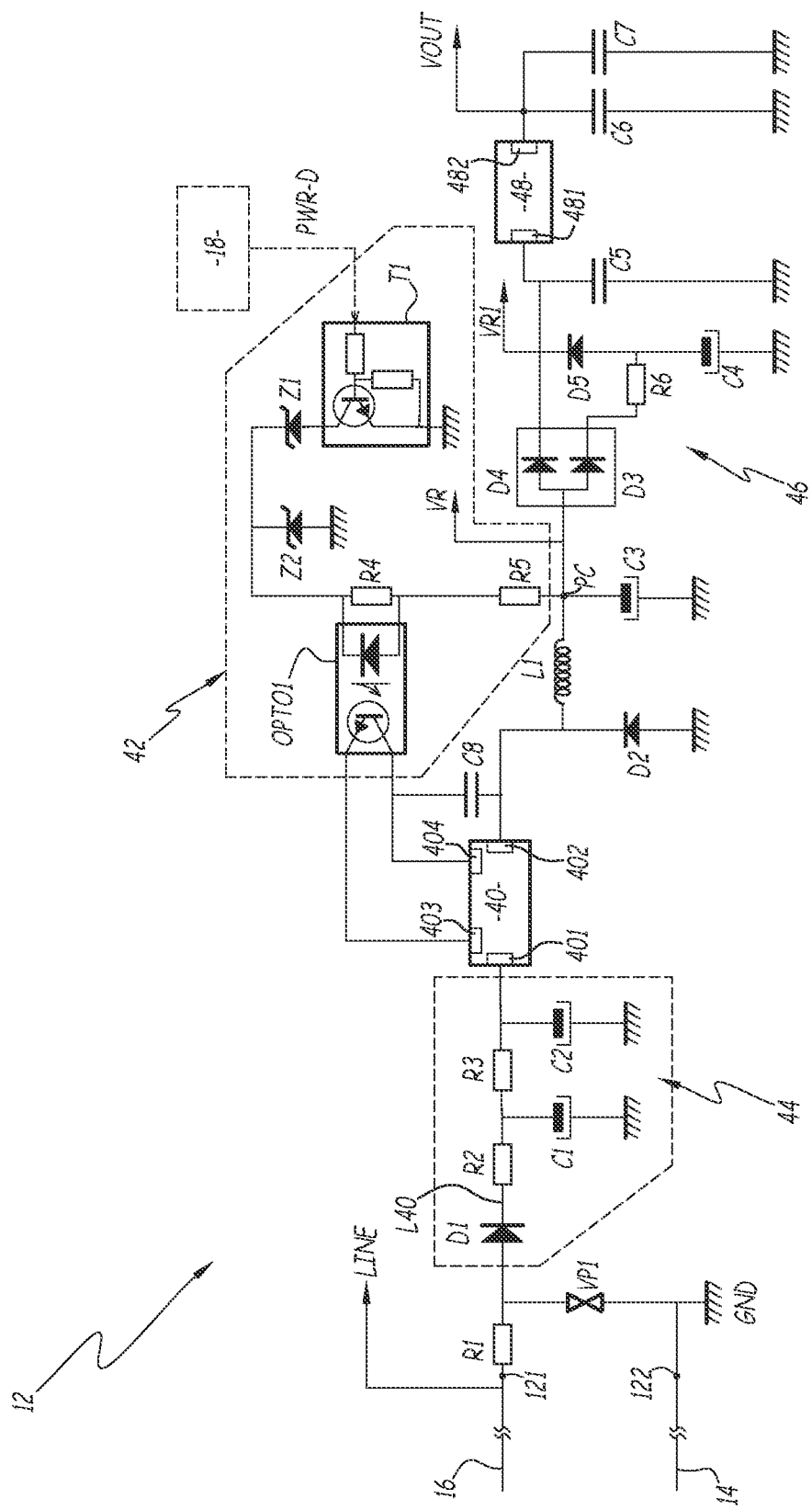
FIG. 2 is an electrical diagram of an example of a power circuit of the motorised actuation device of FIG. 1.

The reference LINE designates an electrical power supply line. In one embodiment, a first end of the first power line is connected electrically to an output of the electrical power circuit 12 for supplying a supply voltage to the motor 8. The supply voltage may be a DC or AC voltage. According to a variant embodiment, the first end of the first supply line LINE is connected to an electrical conductor of the external power source, for example, a phase conductor of an AC network, as shown in FIG. 2.

A second end of the power line LINE is connected electrically to at least one terminal of the switching device 20. Switching the switching device 20 between an open and a closed state selectively enables the motor 8 to be powered or not.

The reference VR designates a control line arranged to control the switching of the switching device 20. In the example shown in FIG. 1, the line VR is connected electrically to the coil 24 to provide a control voltage to the coil 24.

The reference VOUT designates a second supply line intended to supply a stabilized DC electrical voltage to elements of the home automation device 2, in particular to the electronic command and/or control circuit 18.

The reference VR1 designates a third electrical power line, intended to supply a stabilized DC electrical voltage to elements of the home automation device 2, in particular to the sensor 26.

The reference "GND" designates an electrical ground of the home automation device 2. For example, the terminal 121 is connected electrically to the ground GND.

For example, the electrical power circuit 12 is configured to convert and/or distribute the received supply voltage U1 into one or more electrical voltages of different values delivered to corresponding outputs of the electrical power circuit 12. The lines LINE, VR, VR1 and VOUT here are connected electrically to different outputs of the electrical power circuit 12.

The home automation device 2 also includes at least one sensor 26. It may involve one or more position and/or movement sensors configured to output an electrical signal proportional to a position and/or movement. It may involve the position or movement of the screen 4, the motor output shaft 8, the coupling member 10 or any other member driven directly or indirectly by the motor rotor output shaft. Hereafter, the term 'sensor' will be used in the singular whether there is one or more position and/or movement sensors.

The sensor 26 is shown associated here with the motor 8, although in a variant the sensor 26 may be associated with the coupling member 10 or the screen 4.

In other words, the position and/or movement of the screen 4 can be measured indirectly, in particular by measuring the position of a mechanical element forming part of the chain of transmission of the movement supplied by the motor 8.

According to non-exhaustive examples, the sensor 26 is a rotary encoder, or a Hall effect sensor, or a magneto-resistive sensor, or a contact switch, or a telemetry device.

For example, when the motor 8 is an electric motor, the sensor 26 provides an electrical signal proportional to the angular position and/or an angular movement of the motor output shaft or the motor rotor.

An output of the sensor 26 is connected electrically to an input of the electronic control and/or monitoring circuit 18, to transmit signals representing the measured position and/or movement.

Here, the electronic control and/or monitoring circuit 18 includes a processing logic unit 28, a computer memory 30 and a clock 32.

The logic processing unit 28 ("CPU" for Central Processing Unit) here comprises one or more programmable microcontrollers, microprocessor or any other equivalent means time-programmed to execute a computer program or software code and implement all or part of at least one step of a process according to the invention.

The memory 30 forms a non-transitory, machine-readable information storage medium such as a logic processing unit, processor or microprocessor.

According to examples, the memory is a read-only memory (or "ROM" for Read Only Memory), or a random-access memory (or "RAM" for Random Access Memory), or a non-volatile memory of the EPROM (Erasable Programmable Read-Only Memory in English), or EEPROM (Electrically-Erasable Programmable Read-Only Memory), or Flash, or NVRAM (Non-Volatile Random-Access Memory), or an optical memory, or a magnetic memory, or any other appropriate recording technology.

The clock 32 here comprises a crystal oscillator, such as a quartz oscillator.

According to alternative embodiments, the clock 32 may be integrated with the logic unit 28 and/or implemented by the logic unit 28.

The memory 30 is intended to store executable instructions in particular and/or software code, readable by machine or microprocessor, to automatically implement a process for controlling the home automation device 2 when these instructions and/or this code are executed by the logic unit 28.

The memory 30 is also arranged to store signals representing particular values such as current position values, end of travel values, obstacle detection threshold values or signals representing control units paired with the electromechanical actuator.

Figure 3:
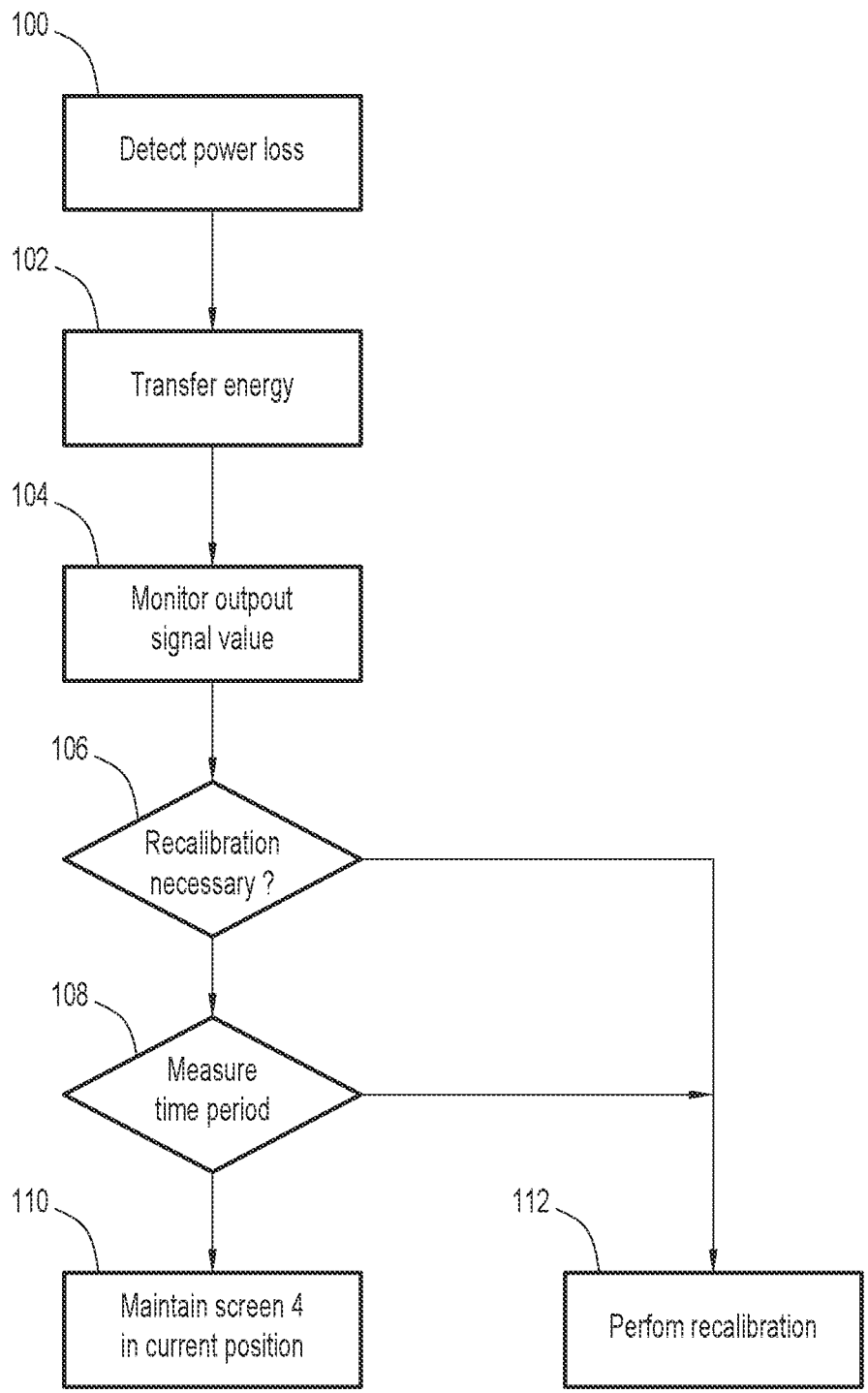
FIG. 3 is a flow diagram of an example of a method of operation of the motorised actuation device of FIG. 1.

The electronic command and/or control circuit 18 is programmed to implement processes in particular and the control process described below with reference to FIG. 3 in particular.

According to alternative embodiments, the electronic circuit 18 includes a programmable logic component of the FPGA (Field Programmable Gate Array) type, or a dedicated integrated circuit of the ASIC (Application Specific Integrated Circuit) type configured to implement such methods.

The electronic circuit 18 is preferably connected electrically to the electrical power circuit 12, to control the operation of the electrical power circuit 12.

For example, to control a movement of the screen 4, the electronic circuit 18 may act on the switching device 20 via the electrical power circuit 12. The electronic circuit 18 may deliver an electrical control signal on the PWR-D line, and, in return, the electrical power circuit transmits an electrical signal on the control line VR to the switching device 20, in order to switch it for a predetermined time and thus power the motor 8.

According to non-illustrated embodiments, the electronic circuit 18 may include a data exchange interface, for example, to communicate with a command receiver 50 and/or with a radio transmitter.

According to one embodiment, the home automation device comprises a command receiver 50 with a signal output 502 connected electrically to the control and/or monitoring unit 18. The command receiver 50 is connected electrically to an electrical ground GND. According to one embodiment, the command receiver 50 is a wired type of receiver, receiving signals representing commands to be executed by a wired link such as a data bus, a carrier current, etc. According to one variant embodiment, the command receiver 50 is an optical type of receiver such as an infrared receiver. Preferably, the command receiver 50 is a radio frequency receiver. In this embodiment, the command receiver 50 is connected electrically to at least one antenna 504.

The command receiver is configured to receive signals representing commands transmitted by at least one control unit, in particular a control unit paired with the actuator. According to one embodiment, the command receiver is also configured to transmit signals. The control unit may be a switch, a keyboard, a remote control or a central control unit, for example, also referred to as a home automation box.

An example embodiment of the electrical power circuit 12 is described with reference to FIG. 2.

The electrical power circuit 12 includes in particular a first 121 and a second 122 electrical power terminal, a voltage regulator 40 such as a switching regulator, a regulation and control loop 42 of the regulator 40, a primary stage 44 connected to the input 401 of the regulator 40 and a secondary stage 46 connected to the output 402 of the regulator 40. The secondary stage 46 includes a voltage regulator 48 in particular, arranged to deliver a voltage of predetermined amplitude to the supply line VOUT, in particular.

For example, the primary stage 44 designates the portion of the supply circuit 12 connected upstream of the input 401 of the regulator 40, that is, between the first 121 and second 122 supply terminals of the supply circuit 12 and the input 401 of the regulator 40. The secondary stage 46 designates the part of the supply circuit 12 connected downstream of the output 402 of the controller 40.

By convention, to define upstream and downstream of an electronic circuit or component, the current flow direction from a terminal 121, 122 of the electrical power circuit 12 to the input 401 of the controller 40 is chosen.

In the illustrated example, the second electrical power terminal 122 is connected electrically to the ground GND of the home automation device. Preferably, the second power terminal 122 of the power circuit 12 is connected electrically to a neutral conductor of the external power source.

A protection circuit, a rectification circuit and a filter circuit are connected electrically in series between the first and second terminals 121, 122 of the electrical power circuit 12 on the one hand and the input 401 of the switching regulator 40 on the other hand via an input branch L40.

The protection circuit includes an surge protection device P such as a spark gap or varistor connected between the first and second terminals 121, 122 of the electrical power circuit 12. The protection circuit may include a resistor R1 to limit the current connected electrically in series between an electrical power terminal 121, 122 and the surge protection device P.

According to one embodiment, the rectifier circuit is a half-wave rectifier circuit and comprises one diode D1. According to a variant embodiment, the rectifier circuit is of the full-wave type comprising a plurality of diodes.

The filter circuit comprises one or more filter capacitors C1, C2 connected electrically between the input branch L40 of the switching regulator 40 and the ground GND. According to one embodiment, the filtering circuit comprises a resistor R2, R3 connected electrically in series upstream of each filtering capacitor C1, C2. Advantageously, the resistor R2, R3, connected upstream of the filtering capacitor C1, C2, enables the current to be limited, in particular during powering up, and thus protect the capacitor by avoiding peaks in current.

The filtering circuit makes it possible to smooth out the output voltage of the rectifier circuit. The filtering circuit also makes it possible to filter out the parasites generated by the switching regulator 40, in order to avoid them polluting the domestic electrical distribution grid.

The input filter capacitors C1 and C2 form a first energy reserve at the input of the regulator 40. Hereafter the input capacitor(s) will be referred to as input capacitor and the singular will be used regardless of the number of capacitors used.

According to illustrative examples, the capacitance value of the input capacitor C1, C2 is less than or equal to 15 µF, of the order of 2.2 µF, or 3.3 µF, or 6.8 µF for example.

In one variant, the number of capacitors thus connected to the input of the controller 40 may be different, equal to one or greater than two, for example. In case of a plurality of input capacitors, the capacitors are identical, for example. According to one alternative embodiment, the capacitors have different capacity values.

The regulator 40 here is a DC-DC step-down regulator. In practice, the supply voltage U1 supplied to the terminals 121 and 122 of the supply circuit 12 is rectified by the diode D1 and filtered by the input capacitors C1, C2, so that the regulator 40 receives a DC input voltage.

For example, the regulator 40 is a switching electrical power such as a chopper. According to an illustrative and not necessarily limiting example, the regulator 40 is a chopper sold by Power Integrations under reference LNK304.

The control loop 42 is configured to deliver a control voltage to the control inputs 403, 404 of the controller 40, in order to set the chopping duty cycle, for example, and thus adjust the value of the voltage delivered at the output 402 of the controller 40 and thus the value of the electrical signal on the control line VR. The control loop 42 here comprises a controlled switch T1, an optocoupler OPTO, a first and a second Zener diode Z1, Z2. The control input terminals 403, 404 of the converter 40 are connected to two electrodes of a transistor of the OPTO optocoupler, one of the electrodes (e.g., the emitter) being connected to the output of the controller 40 via a capacitor C8.

The OPTO optocoupler allows the operation of the controller 40 to be adjusted to vary the output voltage value of the controller 40. In the example shown in FIG. 2, in a variant, the output voltage value adopts two values, depending on whether the controlled switch T1 is open or closed. According to one embodiment, the output voltage value is linked to the operating mode of the home automation device and in particular of the actuator 8. For example, when the switch T1 is open, the output voltage value of the regulator 40 is equal to a second value, called the wake-up value. When the switch T1 is closed, the output voltage value of the regulator is equal to a first so-called standby value. The standby voltage value is lower than the wake-up value.

The controlled switch T1, the first Zener diode Z1 and the resistors R4 and R5 are connected in series between the ground GND and a common point PC connected to the output of the regulator 40 by an inductance L1. The controlled switch may be a transistor, a triac, a relay or any other equivalent controlled switching or interrupting device. The controlled switch T1 includes at least one control electrode arranged to switch the switch when a predetermined electrical signal is applied thereto.

The second Zener diode Z2 is connected electrically in parallel with the first Zener diode Z1 and the controlled switch T1. The cathode of the first Zener diode Z1 is connected electrically with the cathode of the second Zener diode Z2. A light-emitting diode of the optocoupler OPTO is connected in parallel with the resistor R4.

The anode of the light-emitting diode of the optocoupler OPTO is connected electrically between the resistors R4 and R5. The cathode of the light-emitting diode of the optocoupler OPTO is connected electrically to the cathode of the second Zener diode Z2, whose anode is connected to the electrical ground.

When the controlled switch T1 is closed, the first and second Zener diodes Z1, Z2 are connected in parallel between the cathode of the optocoupler's light-emitting diode and ground GND. It is assumed that the Zener voltage of the first diode Z1 is lower than the Zener voltage of the second diode Z2. Under these conditions, the first Zener diode Z1 will drain almost all the current and impose its Zener voltage. The second Zener diode Z2 is not functional. A current flows through the light-emitting diode as soon as the output voltage of the voltage regulator exceeds the sum of the conduction threshold of the light-emitting diode and the Zener voltage of the first Zener diode Z1. This configuration places the converter in a first operating mode in which its output voltage is controlled by the Zener voltage of the first Z1 diode. As previously stated, this output voltage is on the line VR used to switch the switching device 20 to an open position. When the switch T1 is closed, the voltage on the line VR is equal to the standby voltage and the switching device is in the open position, not allowing the motor 8 to be powered. Advantageously, this power cut-off of the motor enables the consumption of the home automation installation to be reduced in standby mode.

When the controlled switch T1 is open, a current flows through the light-emitting diode as soon as the converter output voltage exceeds the sum of the conduction threshold of the light-emitting diode and the Zener voltage of the second Zener diode Z2. The regulator 40 is thus regulated by its output voltage. When the regulator 40 is a chopper, its chopping is regulated by the output voltage of the power converter. This configuration allows the converter to be placed in a second operating mode in which its output voltage is conditioned by the Zener voltage of the second diode Z2. This output voltage will pass through the control line VR and switch the switching device 20 to a closed position. When the switch T1 is open, the voltage on the line VR is equal to the wake-up voltage and the switching device is in a closed position, allowing the motor 8 to be powered for a predetermined time.

As an illustrative example, the Zener voltage of diode Z1 is equal to 6.2 V and the Zener voltage of diode Z2 is equal to 11 V. These voltage values are chosen according to the voltage values required to drive the switching of the regulator 40.

An output of the electrical power circuit 12 is connected to the aforementioned common point PC to provide a control voltage to the control line VR with respect to ground. A capacitor C3 may be connected between the common point PC and ground GND to smooth the control voltage.

As an illustrative example, the value of the electrical voltage between the PC common point and the GND ground may be chosen equal to 12 V or 7 V, depending on the mode of operation of the controller 40.

The output 402 of the controller 40 is connected electrically on the one hand to the inductor L1, connected in series with a capacitor C3, and on the other hand to the cathode of a freewheeling diode D2, the anode of which is connected to the electrical ground.

One or more so-called output capacitors C4 are connected between the electrical ground GND and the cathode of a diode D3, whose anode is connected electrically to the common point PC. Preferably, due to the space problems, only one capacitor is used. Hereafter, the singular term "output capacitor" will designate one or more capacitors.

According to a preferred embodiment, a resistor R6 is connected electrically between the diode D3 and the output capacitor C4 in order to limit the current entering the capacitor and, in particular, the peaks in current during power-up. The output capacitor C4 forms a second energy reserve for the electrical power circuit 12.

A regulating circuit is connected electrically to the cathode of a diode D4, whose anode is connected electrically to the common point PC. The regulating circuit comprises a voltage regulator 48 and filter capacitors C5, C6, C7. The input 481 of the voltage regulator 48 is connected electrically to the cathode of the diode D4 and to a first terminal of the capacitor C5, the second terminal of which is connected electrically to the electrical ground GND. At least one filter capacitor C6, C7 is connected electrically between the output 482 of the voltage regulator 48 and the electrical ground GND.

The power line VOUT is connected to the output 482 of the voltage regulator 48. The voltage regulator 48 is configured to output a DC regulated voltage. According to one embodiment, the output voltage is chosen, equal to 3.3 V for example, in order to power the electronic circuits of the home automation device.

A diode D5 is connected electrically between the capacitor C4 and the voltage regulator 48. The cathode of the diode D5 is connected to the input 481 of the voltage regulator and its anode to the terminal of the output capacitor C4, not connected to the electrical ground GND.

According to illustrative examples, the output capacitor C4 has a capacitance greater than or equal to 1 mF, for example greater than or equal to 1.5 mF. In a variant, the number of capacitors thus connected to the output of the converter 40 may be different, greater than or equal to two for example.

An example of operation of the motorised drive device 6 in the event of an electrical power outage is now described with reference to FIG. 3.

According to one embodiment, the electrical power circuit comprises a module for detecting an electrical power outage. The detection module may include a voltage comparator or an electrical power supervisor, for example.

In normal operation, the drive device 6 is electrically supplied by the non-zero supply voltage $U_1$ provided by the distribution grid. The actuator 8 is in a standby operating mode and the screen 4 is stationary. The controlled switch T1 is closed and the Zener diodes Z1, Z2 are connected in parallel between the electrical ground and the cathode of the light emitting diode of the optocoupler OPTO. The output voltage of the regulator 40 between the common point PC and the ground is thus equal to a first standby voltage. The output capacitor C4 is charged so that the voltage value at its terminals is substantially equal to that of the standby voltage.

In the event of a malfunction of the mains supply, the electrical power is interrupted, accidentally for example, so that the supply voltage U1 has a constant value of zero.

In a step 100, the electronic control and/or monitoring circuit 18 detects an electrical power outage, by means of a measurement signal provided via the electrical power circuit 12 for example. According to a variant embodiment, the detection occurs by receiving an electrical signal representing a power outage from a dedicated sensor.

The electronic circuit 18 acquires the output signal automatically from the position and/or movement sensor 26, at a first frequency F1 for example. When the electronic control and/or monitoring circuit 18 detects a power outage, the value of the signal representing the display position and/or movement at the time of the power outage is stored, in the memory 30 for example.

When the electronic control and/or monitoring circuit 18 detects a power outage, it also triggers the counting down of a time period, called the first time period, by means of the clock 32, for example. The first time period may have a predefined value, programmed at the factory or defined by a user, for example. The predefined time period is chosen as corresponding to the average time period of accidental electrical power outages typically observed on the electrical power grid, for example. In a variant, the predefined time period corresponds to the variable time period of discharge of the output capacitor C4 up to a predefined threshold voltage.

In a variant, the first time period is automatically modulated by the electronic control circuit 18 according to the amount of energy remaining in the output capacitor C4, which can be evaluated by measuring the electrical voltage present across the output capacitor C4. For example, the value of the first time period is automatically recalculated over time by the electronic control circuit 18 as a function of the voltage values across the output capacitor C4 measured periodically.

Thus, when the electrical power outage lasts longer than the predefined time period, the electronic control circuit 18 continues to monitor or measure movement of the load 4 as long as sufficient energy remains in the capacitor C4.

According to particularly advantageous embodiments, in a step 102, subsequent to detection of the power outage, the electronic control and/or monitoring circuit 18 controls the transfer of the energy stored in the input capacitors C1, C2 to the output capacitor C4.

For example, to control the energy transfer, the electronic control and/or monitoring circuit 18 automatically changes the electrical signal applied to the control input 403, 404 of the switching regulator 40 from a first value to a second value.

In the illustrated example, upon detection of the power outage, the electronic control and/or monitoring circuit 18 sends a control signal PWR-D to a control electrode of the controlled switch T1 to switch the controlled switch T1 from a closed mode to an open mode. The Zener diode Z1 is thus disconnected from the electrical ground and only the Zener diode Z2 is connected between the diode of the optocoupler and the electrical ground GND. Since the value of the Zener voltage of the diode Z1 is higher than that of the diode Z2, this results in an increase in the electrical signal value applied to the control input 403, 404 of the switching regulator 40.

In response to this change, the value of the switching duty cycle of the controller 40 is changed and the output voltage value of the controller, between the common point PC and the ground GND, increases to a second output voltage value equal to the wake-up voltage. The diodes D3 and D4 conduct and the output capacitor C4 charges. During the charging time, the regulator consumes a high amplitude current, of between 20 mA and 30 mA, for example. By way of illustration, the capacitor charging time is less than 1 second. Advantageously, because of this relatively high current consumption, the switching regulator 40 operates with a high efficiency, greater than or equal to 50%, for example, greater than it would have in the absence of charging the output capacitor C4.

Once the output capacitor C4 is charged, depending on the circumstances, it is possible that the input capacitors C1 and C2 still contain enough energy to electrically power the regulator 40 for a short time, for less than a few seconds, for example. In this case, with the output voltage values of the regulator 40 and the voltage across the output capacitor C4 being equal, the diodes D3 and D5 are blocked. The diode D4 conducts and the output voltage of the regulator 40 appears on the line VR1 and at the input of the voltage regulator 48. Advantageously, this allows the voltage regulator 48 to keep its output voltage value constant during this time without discharging the output capacitor C4 and thus prolonging the supply to the regulator 48.

When the charge of the input capacitor, C1, C2 is exhausted, the switching regulator no longer provides any output voltage. The diodes D3 and D4 are blocked and the diode D5 conducts. The energy stored in the output capacitor C4 makes it possible to supply the line VR1 as well as the voltage regulator 48 with a stable voltage of higher value than the regulation voltage, at least for the predefined time period, which is of the order of two to five minutes, for example. The capacitance values of the input capacitors C1, C2, indirectly, and of the output capacitor C4 make it possible, in particular, to dimension said predefined time period. The same applies to the threshold voltage below which the capacitor C4 discharges.

Following detection of the power outage (step 100) and, if necessary, following the energy transfer (step 102), the electronic control circuit 18 monitors (step 104) the value of the output signal of the sensor 26 during the predefined time period in order to determine a possible movement of the actuator output shaft and in particular of an element driven by the latter, such as the coupling member 10 or the screen 4.

According to a preferred embodiment, during monitoring, the electronic command and/or control circuit 18 intermittently acquires a signal at the output of the sensor 26, representing a position and/or movement value during the predefined time period, for example at a second frequency F2, which may be equal to or lower than the first frequency F1. The acquisitions may be performed at regular time intervals. For example, the acquisitions can be measured by the clock 32. In a variant, the acquisitions are performed irregularly. Thus, the control electronics 18 can detect automatically whether the screen 4 has moved during a predefined period of time after the electrical power outage, by means of a sensor 26. After each acquisition, the output value of the sensor 26 may be stored in the memory 30.

According to preferred embodiments, the predefined time period is less than or equal to five minutes, preferably less than or equal to two minutes. The predefined time value is then stored in the memory 30, for example.

According to a variant embodiment, during the monitoring step, the electronic control and/or monitoring circuit 18 acquires the output signal of the sensor 26 after a delay equal to the predefined time period. The value of the signal representing the display position and/or movement is then stored in the memory 30, for example.

The electronic control circuit 18 is then turned off until the electrical power is restored. This step enables management of a clean shutdown of the electronic control circuit.

According to advantageous embodiments, the amount of energy remaining in the output capacitor C4 is periodically evaluated by the electronic control circuit 18, with a counting frequency different from the frequency F2, for example.

For example, a step of turning off the electronic control circuit 18 is implemented automatically when the amount of energy remaining in the output capacitor C4 becomes lower than a predefined threshold.

It is understood that the electronic circuit 18 is not powered directly from the power grid (since the electrical power is interrupted) during step 104, but is powered from at least one energy reserve C1, C2, C4.

In particular, if step 102 has been implemented, the electronic control circuit 18 is powered electrically during the monitoring step 104 by energy contained in the output capacitor C4. In the illustrated example, the output capacitor C4 discharges by powering the regulator 48, which then continues to power the line VOUT with a DC voltage (here equal to 3.3 V), until the capacitor C4 is discharged, for example, or until the electronic control circuit 18 has shut down as a result of step 104.

It is thus understood that the values of the components of the electrical power circuit 12, like the input and output capacitors, are chosen in particular so that at least the electronic control circuit 18 and the sensor are electrically powered so as to operate at least for the predefined time period and in particular for the entire time period of the implementation of step 104.

During step 104, the electronic circuit 18, such as the processing logic unit 28, also monitors the power outage time period and checks whether the power outage time period is longer than the predefined time period. If the outage time period is greater than the predefined time period the electronic circuit 18 stores this information in a memory 30. For example, the circuit 18 can change a Boolean variable value stored in the memory 30, representing a possible exceeding of the predefined time period, from a false value to a true value. In practice, measuring the outage time period is not necessarily required, and instead, the step can be interrupted after the first time period.

According to one embodiment, when the power outage is detected, the electronic circuit 18 starts a clock counter and detects when the counter exceeds the predefined time period. According to a variant embodiment, the monitoring of the power outage time period is performed using a timer initialized to a time equal to the predefined time period and the electronic circuit 18 detects when the timer reaches zero.

When the electrical power is restored, the electrical power circuit 12 is again normally supplied by the supply voltage U1, the electronic control circuit 18 automatically determines (step 106) whether it is necessary to recalibrate the position of the screen 4.

"Recalibration" here means a movement of the screen 4 towards at least one predefined reference position and the detection of said reference position. The movement and detection are commanded and/or controlled by the electronic control circuit 18 and carried out by means of the actuator. The reference position is a screen end position such as a stop or an end position, for example, that is, a position in which the screen is fully rolled up or a position in which the screen is fully unrolled.

The determination is made in a step 106, during which the electronic control circuit 18 compares the position and/or movement value(s) recorded in the monitoring step with that of an initial position at the time of the power outage.

The initial position is defined as being the position occupied by the screen 4 when the electrical power loss occurs. The value of this position has been recorded in the memory 30 during step 100, for example.

In practice, the screen 4 is considered to have moved if the representative position and/or movement value(s) recorded during the monitoring step 104 is different from the representative value of the initial position recorded during the detection step 100.

In a variant, in the determination step 106, the electronic circuit determines whether the power outage time period is greater than the predefined time period. This determination may be made by comparing the time period value recorded at the end of the monitoring step 104 with the value of the predefined time period. According to a variant embodiment, the electrical circuit 18 acquires the Boolean variable value representing whether the predefined time period has been exceeded.

If the screen 4 is considered to have moved and/or if the cut-off time was less than the predefined time period at the end of the comparison performed in step 106, then a recalibration is performed (step 112).

If the time period of the electrical power outage period is greater than the predefined time period, then a recalibration is performed (step 112).

Otherwise, the screen 4 is kept in its current position (step 110), or current position, that is, the position occupied by the screen when the electrical power is restored. In other words, recalibration is inhibited.

Thus, in a step 112, the electronic control circuit 18 controls a movement of the screen 4 towards at least a first predefined reference position, this movement being performed by means of the actuator 8. When the first predefined position is reached, the electronic command and control circuit acquires the signal representing the screen position 4, at the output of the sensor 26. The acquired value is then stored in the memory 30.

According to one embodiment, a screen second movement towards a second predefined position is carried out during the recalibration. When the second predefined position is reached, the electronic circuit 18 acquires the signal representing the screen position 4 and records it in the memory 30.

According to a variant embodiment, the value representing the second predefined position is deduced from the value of the first predefined position using a formula stored in the memory 30.

According to one embodiment, if a recalibration step 112 is required after an electrical power outage, it is automatically triggered as soon as the electrical power outage is over.

According to a variant embodiment, the recalibration step 112 is not performed as soon as the electrical electrical power is restored but following receipt of an actuator control command by the user. Advantageously, deferring the recalibration step makes it possible to avoid surprising the user. This also avoids triggering a recalibration step in the middle of the night when the user is asleep.

Thanks to the invention, the detection or measurement of possible screen movement during an electrical power outage allows the electronic command and/or control circuit 18 to determine whether or not it is necessary to recalibrate the screen position 4 when the electrical power is restored. Thus, it is not necessary to recalibrate the screen position 4 systematically after each power supply interruption, thus avoiding premature wear of the installation 2, in particular premature wear of the arms of a terrace awning.

Furthermore, by transferring at least part of the energy stored in the input capacitors C1 and C2 to the output capacitor C4 during an electrical power outage, the drive device 6 has enough energy in reserve to detect any screen movement for a predetermined time period after the electrical power outage.

In the illustrated example, without this energy transfer, the electronic control circuit 18 could only be powered for a few seconds, discharging the input capacitors C1 and C2 to power the converter 40 in order to maintain the constant voltage on the VOUT line.

Indeed, let us assume that the actuator is in standby mode when the electrical power outage takes place and that no transfer of charge from the input capacitor C1, C2 to the output capacitor C4 is performed after detection of the electrical power outage. In this case, the standby voltage is supplied by the switching regulator 40 from the energy stored in the input capacitor. To control the switching regulator, the control loop 42 consumes a current of about 1.5 mA. At the output of the switching regulator, the various electronic circuits of the secondary stage such as the voltage regulator 48, the electronic circuit 18 and the sensor 26 consume little current. As an illustration, these circuits consume a current of about 100 µA when the actuator is in standby mode. As a result, the efficiency of the switching regulator 40 to supply the secondary stage 46 is very low, less than 10% for example. Under these conditions, the charge of the input capacitor C1, C2 is consumed very quickly and electrical power to the device is only possible for a very short time and much less than the predefined time period. The input capacitor charge is exhausted after a period of between 5 and 6 seconds, for example. This method therefore does not allow the aforementioned electronic circuits 18, 26, 48 to be powered for the predefined time period equal to 2 minutes, for example, and leads to a significant waste of the energy stored in the input capacitor.

In a different way, transferring all or part of the charge of the input capacitor C1, C2 to the output capacitor C4 enables supply of the control loop only during the output capacitor charging time. Since the charging time is short, less than 1 second, for example, this high-power consumption lasts only a short time, compared to the predefined time period, and therefore only slightly discharges the input capacitor. Moreover, the charge of the output capacitor C4 consumes a high current, of between 30 mA and 40 mA for example, at the output of the controller 40. Advantageously, the high current consumption allows the switching regulator to operate with a high efficiency, greater than 50%, for example. Thus, due to the low losses, a maximum of the input capacitor charge is transferred to the output capacitor. In some embodiments, depending on the dimensioning of the components and in particular of the capacitors C1, C2, C4, the input capacitor may not be completely discharged at the end of the transfer.

Such a method can be implemented in a simple way in existing drive devices, without imposing major structural modifications to their electrical power circuit.

Furthermore, such a method is compatible with the power management and power saving requirements that the drive devices 6 must meet. In particular, the electronic circuit 18 has a sufficient power reserve to implement the measurement and detection steps during the power outage, even when the power outage has occurred, while the drive device 6 is in a standby or power saving mode.

Many other embodiments are possible.

In particular, the embodiments described above can be generalized to the case of a drive device 6 for a home automation system 2 in which the screen 4 is replaced by a movable mechanical load other than a screen.

The present invention also relates to a motorised drive device comprising an electronic command and control circuit 18, as previously described. The electronic circuit 18 comprises the means and at least one processing logic unit in particular, arranged to implement all or part of at least one step of the method as described above.

The embodiments and variants contemplated above may be combined with each other to give rise to new embodiments.

The invention claimed is:

1. A method for controlling a motorised drive device including an actuator coupled to a movable mechanical load, the method comprising:
   a) detecting a loss of electrical power to the motorised drive device, by an electronic control circuit of the motorised drive device;
   b) subsequent to detecting a loss of power, transferring at least a portion of the energy stored in at least a first filter capacitor connected to the input of a voltage regulator of the motorised drive device, to a second capacitor connected to the output of the voltage regulator, the input of the voltage regulator being connected to electrical power connectors of the motorised drive device;
   c) determining, by the electronic control circuit, during a first time period following the loss of power, whether the mechanical load has moved, the electronic control circuit being powered by the second capacitor during this determining step; and
   d) when power to the motorised drive device is restored, controlling the movement of the load, by the electronic control circuit and by means of the actuator, into a predefined reference position if mechanical load movement has been determined in step c), or otherwise, keeping the mechanical load in its current position if no movement has been determined in step c).

2. The method according to claim 1, wherein the method further comprises the electronic control circuit measuring the time period of electrical power interruption, and wherein, in step d), the mechanical load is moved into a predefined reference position if the interruption time period is greater than or equal to a predefined maximum value even if no movement was detected in step c).

3. The method according to claim 2, wherein the first time period is equal to the predefined maximum value.

4. The method according to claim 1, wherein the energy transfer includes modification of the electrical voltage applied to a control input of the voltage regulator by the electronic control circuit from a first value to a second value.

5. The method according to claim 1, wherein the first time period has a predefined value.

6. The method according to claim 1, wherein the first time period is modulated automatically by the electronic control circuit depending on the amount of energy remaining in the second capacitor.

7. The method according to claim 1, wherein the amount of energy remaining in the second capacitor is periodically evaluated by the electronic control circuit.

8. The method according to claim 1, which further includes turning off the electronic control circuit when the amount of energy remaining in the second capacitor becomes less than a predefined threshold.

9. A motorised drive device, comprising an actuator adapted to be coupled to a movable mechanical load, an electronic control circuit adapted to drive the actuator, electrical power connectors, a voltage regulator whose input is connected to the electrical power connectors, at least a first filter capacitor connected to the input of the voltage regulator, a second capacitor connected to the output of the voltage regulator, wherein the electronic control circuit is programmed to:
   a) detect a loss of electrical power to the motorised drive device;
   b) subsequent to the detection of loss of electrical power, transfer at least a portion of the energy stored in the at least one first capacitor to the second capacitor;
   c) determine during a first time period following the loss of electrical power whether the mechanical load has moved, the electronic control circuit being powered by the second capacitor during this determining step; and
   d) control the mechanical load movement, when the electrical power to the motorised drive device is restored, by means of the actuator, towards a predefined reference position if a mechanical load movement has been determined in step c), or otherwise, keep the mechanical load in its current position if no movement has been determined in step c).

10. A home automation installation comprising a mechanical load movable between an open position and a closed position and a motorised drive device according to claim 9, the actuator of the motorised drive device being coupled to a screen to move the mechanical load between the open position and the closed position.

11. The method according to claim 2, wherein the energy transfer includes modification of the electrical voltage applied to a control input of the voltage regulator by the electronic control circuit from a first value to a second value.

12. The method according to claim 3, wherein the energy transfer includes modification of the electrical voltage applied to a control input of the voltage regulator by the electronic control circuit from a first value to a second value.

13. The method according to claim 2, wherein the first time period has a predefined value.

14. The method according to claim 3, wherein the first time period has a predefined value.

15. The method according to claim 4, wherein the first time period has a predefined value.

16. The method according to claim 2, wherein the first time period is modulated automatically by the electronic control circuit depending on the amount of energy remaining in the second capacitor.

17. The method according to claim 3, wherein the first time period is modulated automatically by the electronic control circuit depending on the amount of energy remaining in the second capacitor.

18. The method according to claim 4, wherein the first time period is modulated automatically by the electronic control circuit depending on the amount of energy remaining in the second capacitor.

19. The method according to claim 2, wherein the amount of energy remaining in the second capacitor is periodically evaluated by the electronic control circuit.

20. The method according to claim 3, wherein the amount of energy remaining in the second capacitor is periodically evaluated by the electronic control circuit.

* * * * *